US012545047B2

(12) United States Patent
Fujisawa et al.

(10) Patent No.: US 12,545,047 B2
(45) Date of Patent: Feb. 10, 2026

(54) WRITING INSTRUMENT PART, METHOD FOR MANUFACTURING WRITING INSTRUMENT PART, AND WRITING INSTRUMENT

(71) Applicant: MITSUBISHI PENCIL COMPANY, LIMITED, Tokyo (JP)

(72) Inventors: Kiyoshi Fujisawa, Fujioka (JP); Ryota Kubo, Fujioka (JP)

(73) Assignee: MITSUBISHI PENCIL COMPANY, LIMITED, Tokyo (JP)

( * ) Notice: Subject to any disclaimer, the term of this patent is extended or adjusted under 35 U.S.C. 154(b) by 0 days.

(21) Appl. No.: 18/865,170

(22) PCT Filed: Aug. 17, 2023

(86) PCT No.: PCT/JP2023/029684
§ 371 (c)(1),
(2) Date: Nov. 12, 2024

(87) PCT Pub. No.: WO2024/038890
PCT Pub. Date: Feb. 22, 2024

(65) Prior Publication Data

US 2025/0313033 A1 Oct. 9, 2025

(30) Foreign Application Priority Data

Aug. 18, 2022 (JP) ................................ 2022-130712

(51) Int. Cl.
*B43K 7/00* (2006.01)
*B27N 5/00* (2006.01)
*B43K 7/02* (2006.01)

(52) U.S. Cl.
CPC ................ *B43K 7/005* (2013.01); *B27N 5/00* (2013.01); *B43K 7/02* (2013.01)

(58) Field of Classification Search
CPC ...... B43K 15/00; B43K 19/14; B43K 19/145; B29D 23/00; A45D 40/20
See application file for complete search history.

(56) References Cited

U.S. PATENT DOCUMENTS 6,092,950 A * 7/2000 Handl ....................... D21J 1/16
401/96
12,466,210 B2 * 11/2025 Kubo .................. A61K 8/0229
(Continued)

FOREIGN PATENT DOCUMENTS

JP 56-63414 A 5/1981
JP 63-882 U 1/1988
(Continued)

OTHER PUBLICATIONS

Lee Chang Soon; Machine Translation of KR-20120036082-A (Year: 2012).*
(Continued)

*Primary Examiner* — David P Angwin
*Assistant Examiner* — Bradley S Oliver
(74) *Attorney, Agent, or Firm* — Oblon, McClelland, Maier & Neustadt, L.L.P.

(57) ABSTRACT

A writing instrument part that improves the releasability of a core pin is provided. In a writing instrument part by the insert molding method in which a wooden barrel material made of natural wood flour and a water-soluble resin binder is injected into a mold, the wooden barrel material and a core pin having a paper straw inserted therein are integrated, and a two-layer structure having a paper straw layer as an inner layer and a wooden barrel layer as an outer layer is formed.

6 Claims, 11 Drawing Sheets

(56) References Cited

U.S. PATENT DOCUMENTS

| | | | | |
|---|---|---|---|---|
| 2011/0129284 | A1 | 6/2011 | Thies et al. | |
| 2025/0326931 | A1* | 10/2025 | Thies | B43K 19/14 |

FOREIGN PATENT DOCUMENTS

| | | | | | |
|---|---|---|---|---|---|
| JP | 2001-54997 | A | | 2/2001 | |
| JP | 2006-181726 | A | | 7/2006 | |
| JP | 2008-105311 | A | | 5/2008 | |
| JP | 2010-105325 | A | | 5/2010 | |
| JP | 2011-527953 | A | | 11/2011 | |
| JP | 2012-20568 | A | | 2/2012 | |
| JP | 2012-228790 | A | | 11/2012 | |
| JP | 2014-43077 | A | | 3/2014 | |
| JP | 2015-231702 | A | | 12/2015 | |
| JP | 2019-115989 | A | | 7/2019 | |
| KR | 20120036082 | A | * | 4/2012 | B43K 7/005 |

OTHER PUBLICATIONS

International Search Report issued Sep. 19, 2023, in PCT/JP2023/029684, filed on Aug. 17, 2023, 2 pages.

* cited by examiner (b)
5
5b
5c
5d
5e
5f

WRITING INSTRUMENT PART, METHOD FOR MANUFACTURING WRITING INSTRUMENT PART, AND WRITING INSTRUMENT

TECHNICAL FIELD

The present invention relates to writing instrument parts, a method for making parts for writing instruments using wood flour as a natural material, and a writing instrument.

BACKGROUND ART

Wood flour has been conventionally used as material for a barrel member, a writing instrument part, which constitutes a writing instrument. (See Patent Literature 1 to 5)

Meanwhile, writing instrument parts are often made by injection molding because complicated features can be molded in large quantities.

For example, Patent Literature 6 discloses a resin-molded part forming the outer shape of a writing instrument as an example of a writing instrument part made by injection molding.

Specifically, in the injection molding process described in Patent Literature 6, a mold is used in which a core pin forming the inner surface of a barrel member is set, and a molten resin material is injected from the gate, which is a resin injection hole provided on the mold, to fill the space in the mold with the resin material. After the filled resin material is cured, the core pin is removed and the barrel member is obtained by opening the mold.

CITATION LIST

Patent Literature

PTL 1: JP-T-2011-527953
PTL 2: JA-A-2006-181726
PTL 3: JP-A-2012-20568
PTL 4: JP-UM-A-63-882
PTL 5: JP2001-54997
PTL 6: JP-A-2012-228790

SUMMARY OF INVENTION

Technical Problem

As described above, writing instrument parts are commonly made by injection molding, and then, various synthetic resin materials can be used such as polypropylene, polycarbonate, and ABS resin.

Meanwhile, when writing instrument parts are molded by injection molding using a wooden barrel member with wood flour as the base (main) material instead of using the above-described synthetic resin material, the following problems may arise.

For example, in the manufacturing process of a barrel member (e.g., a front barrel), a core pin is first set in a mold for injection molding to form a space for forming a barrel member, and the above wooden barrel material is injected into the space in the mold. Then, the mold is removed and a molded article in which the wooden barrel material and the core pin are integrated is produced by insert molding. Then, in a subsequent process, the core pin is pulled out of the molded article and released from the mold to obtain a barrel member with the desired shape. However, when forming a barrel member by this method, the molded article needs to be heated to cure the wooden barrel material part, but the releasability of the core pin deteriorates due to the heating, and the inner surface becomes distorted when the core pin is forcibly pulled out.

The present invention was made in view of the above-mentioned problems, and the purpose of the present invention is to provide a writing instrument part in which the releasability of the core pin is improved, a method of manufacturing the writing instrument part, and a writing instrument including the writing instrument part, with respect to the writing instrument part produced by releasing the core pin from the molded article in which the wooden barrel material and the core pin are integrally molded by insert molding.

Solution to Problem

The writing instrument part according to the present invention is characterized in that the part in which the wooden barrel material and the core pin in which a paper straw is inserted are integrally molded by insert molding in which the wooden barrel material composed of wood flour and a binder of water-soluble resin is injected into the mold and a two-layer structure having a paper straw layer on the inner layer and a wooden barrel layer on the outer layer is formed by releasing the core pin.

Thus, the core pin is made slippery by the effect of the paper straw layer, and the releasability when the core pin is pulled out can be greatly improved.

In the writing instrument parts according to the present invention, it is desirable that the wood flour be sawdust of coniferous trees such as cedar, cypress, incense cedar, or red cedar, or of broadleaf trees such as beech, sawtooth oak, or oak, or bamboo powder, and it is desirable that the binder be cellulose or a cellulose derivative; and it is further desirable that the paper straws be tubular, made by agglutinating plant fibers or other fibers.

In the method of manufacturing the writing instrument parts according to the present invention, a space having the shape of the writing instrument part is first formed in a mold by setting the core pin inserted with a paper straw, and a wooden barrel material composed of wood flour and binder of water-soluble resin is injected into the space through a mold spout provided on the mold. After injection, the mold is removed, and the first molded article is produced in a state where the wooden barrel material and the core pin are integrally formed by insert molding. By heating the first molded article to harden and releasing the core pin from the second molded article, which is the heated first molded article, a writing instrument part having a two-layer structure with a straw layer on the inner layer and wooden barrel layer on the outer layer is obtained. This manufacturing method allows the core pin to slide easily and greatly improves the releasability due to the effect of the paper straw layer when the core pin is pulled out.

In the manufacturing method of a writing instrument part according to the present invention, on the mold, a gate connected to the mold spout is formed as a storage space for the wooden barrel material, and the gate is circumferentially provided on an outer surface of the core pin that is formed between the mold spout and the above space. The core pin is released from the second molded article and the excess portion molded into the shape of the gate is cut off to obtain the writing instrument parts with the two-layer structure described above.

In the manufacturing method of a writing instrument part according to the present invention, it is desirable that the heating to the first molded article is carried out under the condition of 150° C. for one hour and the wood flour is sawdust from coniferous trees such as cedar, cypress, incense cedar, or red cedar, or from broadleaf trees such as beech, sawtooth oak, or oak, or bamboo powder, and the binder is desirably cellulose or a cellulose derivative; and it being further desirable that the paper straws be tubular, made by agglutinating plant fibers or other fibers.

Writing instruments according to the present invention include the writing instrument parts according to the present invention described above. Further, the writing instruments according to the present invention include the writing instrument parts manufactured by the above-described manufacturing method of the writing instrument parts according to the present invention described above.

Advantageous Effects of Invention

The present invention makes it possible to provide a writing instrument part that improves the releasability of the core pin.

DESCRIPTION OF EMBODIMENTS

A writing instrument part according to the present invention, a method of manufacturing the writing instrument part, and a writing instrument will be described in detail below with reference to the drawings. However, the present invention is not limited to these embodiments. In some cases, components that can be described similarly in the description and drawings of the present invention will be referred to by the same reference signs, and duplication of description will be omitted.

Configuration of Writing Instruments

Figure 1A:
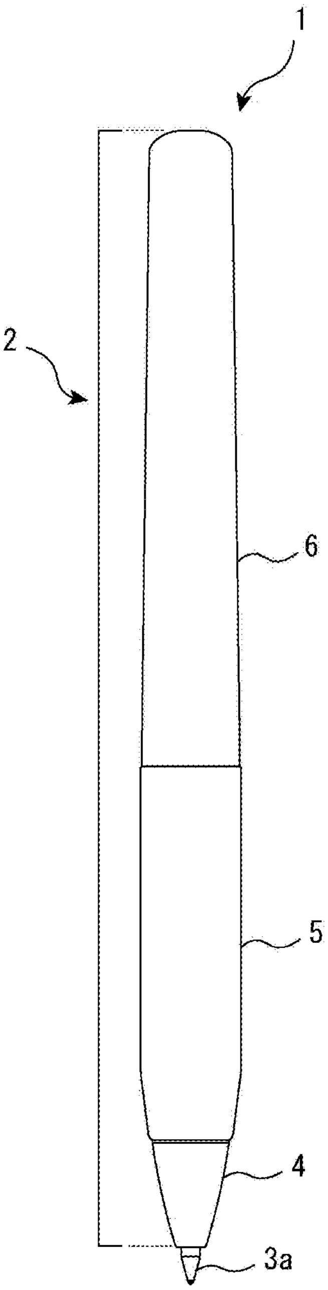
FIGS. 1A to 1C are views illustrating an example of the configuration of a writing instrument according to the present invention.
Figure 1B:
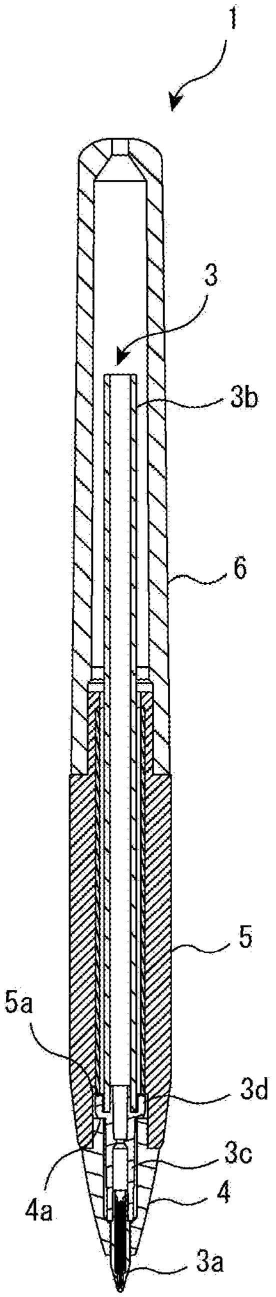
Figure 1C:
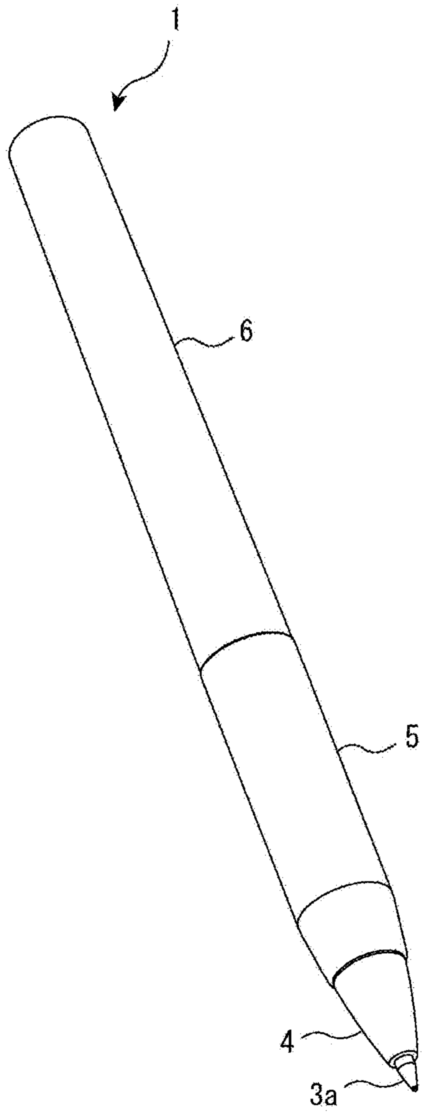

FIGS. 1A to 1C are views illustrating an example of the configuration of a writing instrument according to the present embodiment, and FIG. 1A is a front view of the external appearance of the writing instrument, 1B is a cross-sectional view of the writing instrument, and 1C is a perspective view of the writing instrument. In the present embodiment, the configuration of a ballpoint pen is described as an example of a writing instrument.

A ballpoint pen 1 (writing instrument 1) according to the present embodiment has a barrel 2 having an approximately cylindrical shape and accommodates a refill 3 in the barrel 2. The barrel 2 is composed of a wooden barrel tip 4, a front barrel 5, and a rear barrel 6 in the order described from the tip end from which a ballpoint pen tip 3*a* protrudes which is part of the refill 3. The wooden barrel tip 4, the front barrel 5, and the rear barrel 6 are formed as writing instrument parts (barrel members) of the present embodiment by injection molding in which the wooden barrel material made of wood flour, a natural material, as a base material (main component) is injected into a predetermined mold. As for the barrel 2, the rear end of the wooden barrel tip 4 and the front end of the front barrel 5, and the rear end of the front barrel 5 and the front end of the rear barrel 6 are detachably fitted, respectively.

As described above, the refill 3 to be accommodated in the barrel 2 is provided with a long thin cylindrical ink reservoir 3*b* storing ink, a joint member 3*c* attached to the tip end of the ink reservoir 3*b*, and a ballpoint pen tip 3*a* attached to the tip end of the joint member 3*c*.

In FIG. 1B, the ballpoint pen 1 has a structure in which the upper surface 4*a*, the periphery of the opening, of the rear end of the wooden barrel tip 4 and the locking member 5*a* provided on the inner periphery near the tip end of the front barrel 5 sandwich the flange portion 3*d*, or the flange portion 3*d* provided on the joint member 3*c*, provided on the outer periphery of the refill 3, for receiving the writing pressure.

Configuration of Writing Instrument Part

Figures 2A, 2B, 2C, 2D, 2E, 2F:
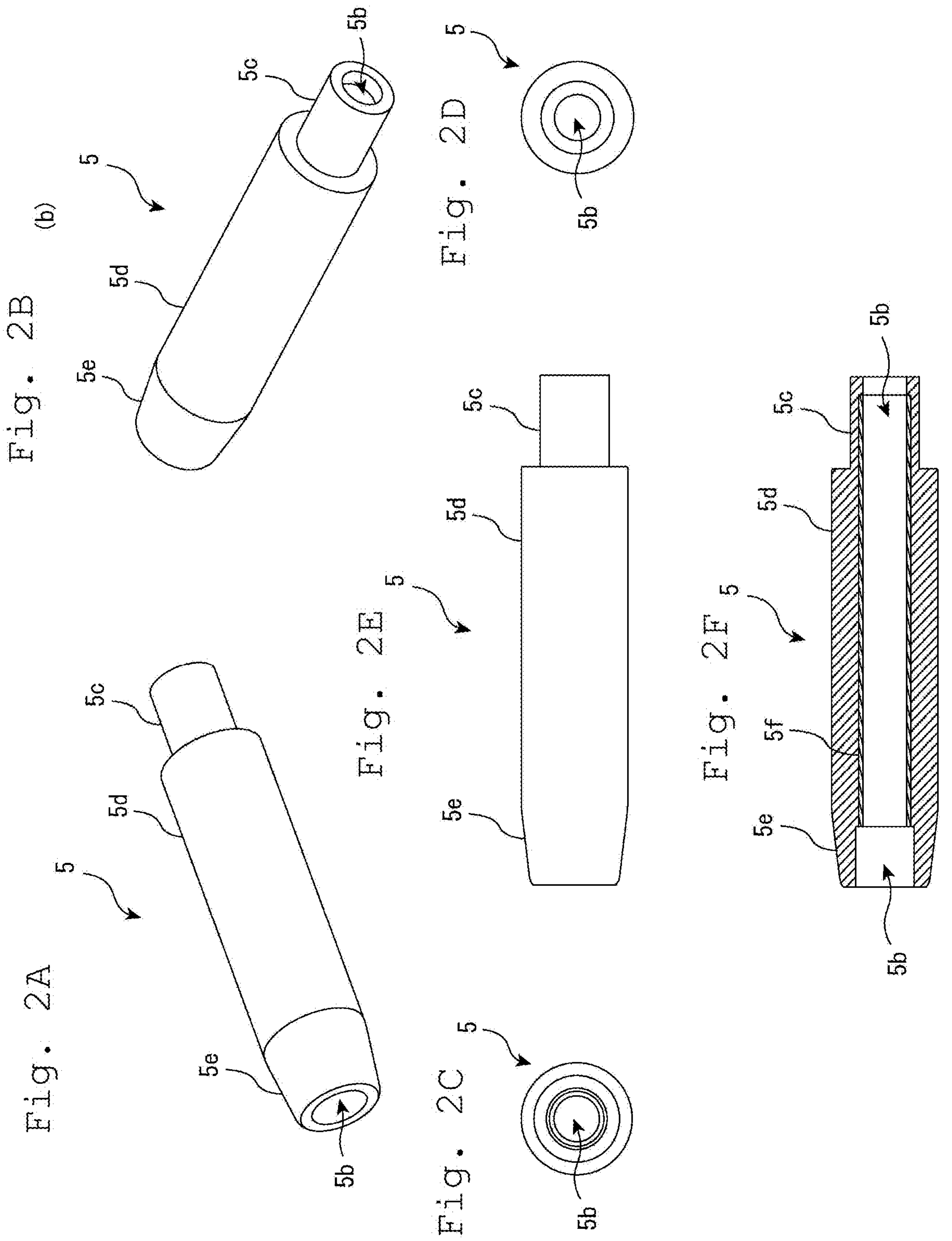
FIGS. 2A to 2F are views illustrating an example of the configuration of a front barrel which is one of the writing instrument parts according to the present invention.

FIGS. 2A to 2F are views illustrating an example of the configuration of the front barrel, which is one of the writing instrument parts according to the present embodiment; FIG. 2A is a front perspective view, FIG. 2B is a rear perspective view, FIG. 2C is a bottom view, FIG. 2D is a plan view, FIG. 2E is a front view, and FIG. 2F is a front cross-sectional view, respectively.

As shown in FIGS. 2A to 2F, the front barrel 5 has a penetrating hole 5*b* provided so that the ink reservoir 3*b* of the refill 3 can be inserted therethrough, and has a configuration in which a connecting portion 5*c* formed into an approximately cylindrical shape as a rear end portion to which the rear barrel 6 is connected by press-fitting, a cylindrical portion 5*d* formed into an approximately cylindrical shape having a larger outer diameter than the connecting portion 5*c*, and a tapered portion 5*e* tapered toward the tip end having a tip end opening (the tip end of the penetrating hole 5*b*) to be press-fitted to the wooden barrel tip 4, are connected.

In addition, the front barrel 5 is provided with an inner layer 5*f* of the paper straw (the paper straw layer 5*f*) in close contact with the wall surface of the penetrating hole 5*b*. That is, the front barrel 5 forms a two-layer structure together with the wooden barrel layer constituting the outer layer (the layer composed of the connecting portion 5*c*, the cylindrical portion 5*d* and the tapered portion 5*e*). The paper straw layer Sf is provided for the purpose of improving the releasability of the core pin described later. The material of the paper straw may be any tubular material made by agglomeration of plant fibers or other fibers, as long as it does not stick to the core pins when molded below 150° C. and integrates (including tightening and bonding by shrinkage) with the wood barrel material after drying. The wall thickness of the paper straw is preferably 0.2 mm to 2.0 mm.

Preferable Wooden Barrel Materials

For writing instrument parts according to the present embodiment, the preferred wooden barrel material will be described.

The wooden barrel material is composed of wood flour as a natural material and a water-soluble resin as a binder, for example, and the compounding ratio of the wood flour and the binder is preferably 9:1 to 6:4, and further preferably 9:1 to 7:3.

Sawdust from coniferous trees such as cedar, cypress, or pine tree, or from deciduous trees such as beech, oak, or sawtooth oak, or cork or bamboo powder can be used as wood flour, preferably with a particle size of less than 3 mm to obtain better surface properties. When the particle size is 3 mm or more, it is undesirable because there may be irregularities on the surface of parts due to particles. Furthermore, the particle size of the wood flour is preferably 0.1 mm or more to prevent it from distorting during drying. When the particle size is less than 0.1 mm, it is undesirable because the pathways for moisture are likely to be closed during shrinkage during drying, and the wooden barrel material may be distorted so that a proper shape cannot be obtained.

As binders, water-soluble or hydrophilic substances are preferable, such as cellulose, cellulose derivatives (carboxymethyl cellulose, ammonium carboxymethyl cellulose, sodium carboxymethyl cellulose, methylcellulose), sodium alginate, polyvinyl alcohol, polyoxyethylene, polyacrylamide, copolymerized maleic acid resin.

Method of Manufacturing

Next, a method of manufacturing a writing instrument part according to the present embodiment will be described in detail. In the present embodiment, as an example of a method of manufacturing a writing instrument part, a method of manufacturing a front barrel 5 will be described, and a wooden barrel tip 4 and a rear barrel 6 can be similarly manufactured.

Figure 3:
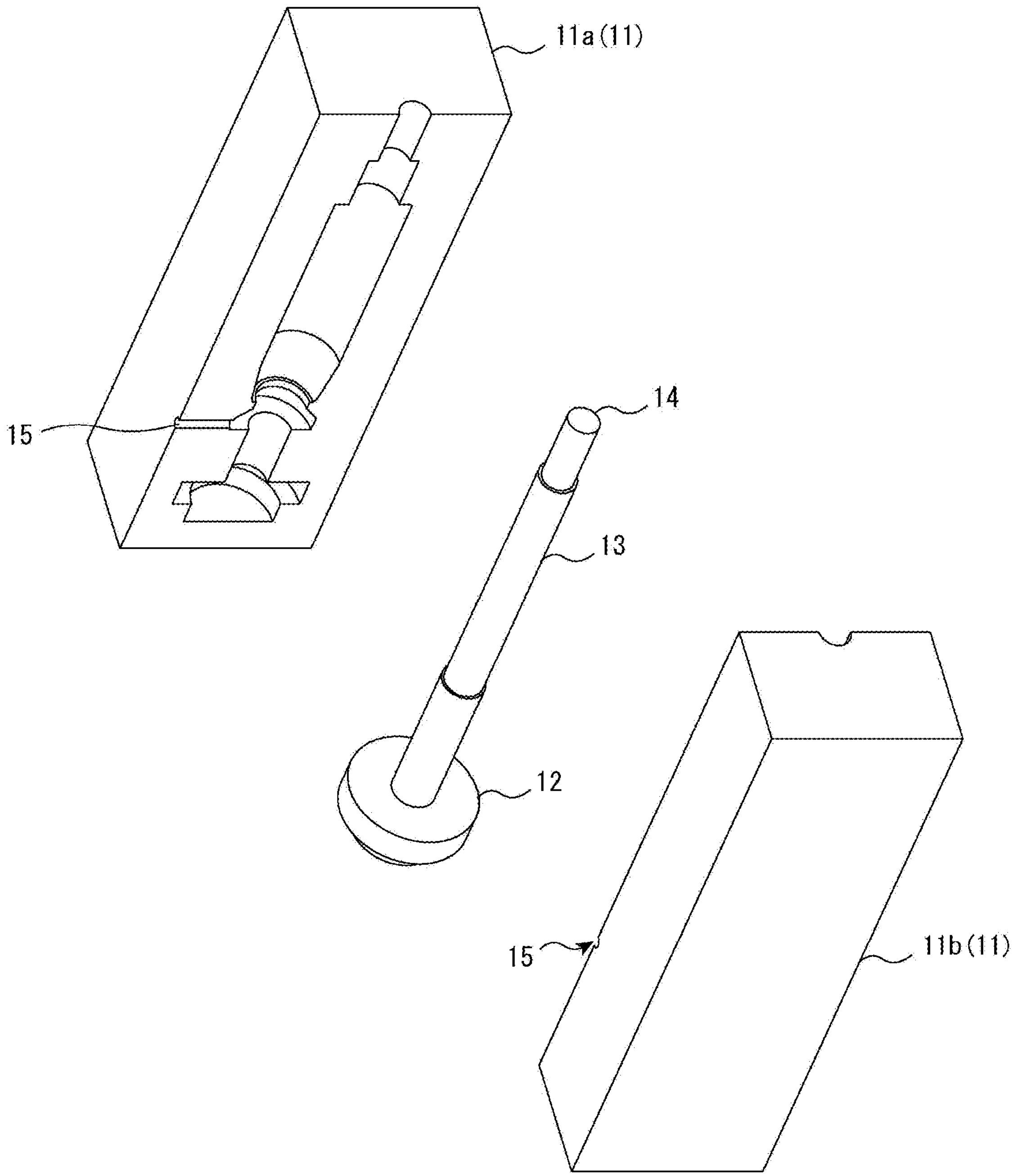
FIG. 3 is a view illustrating an example of a member for manufacturing which is to be used in the method of manufacturing the writing instrument part according to the present invention.
Figure 4:
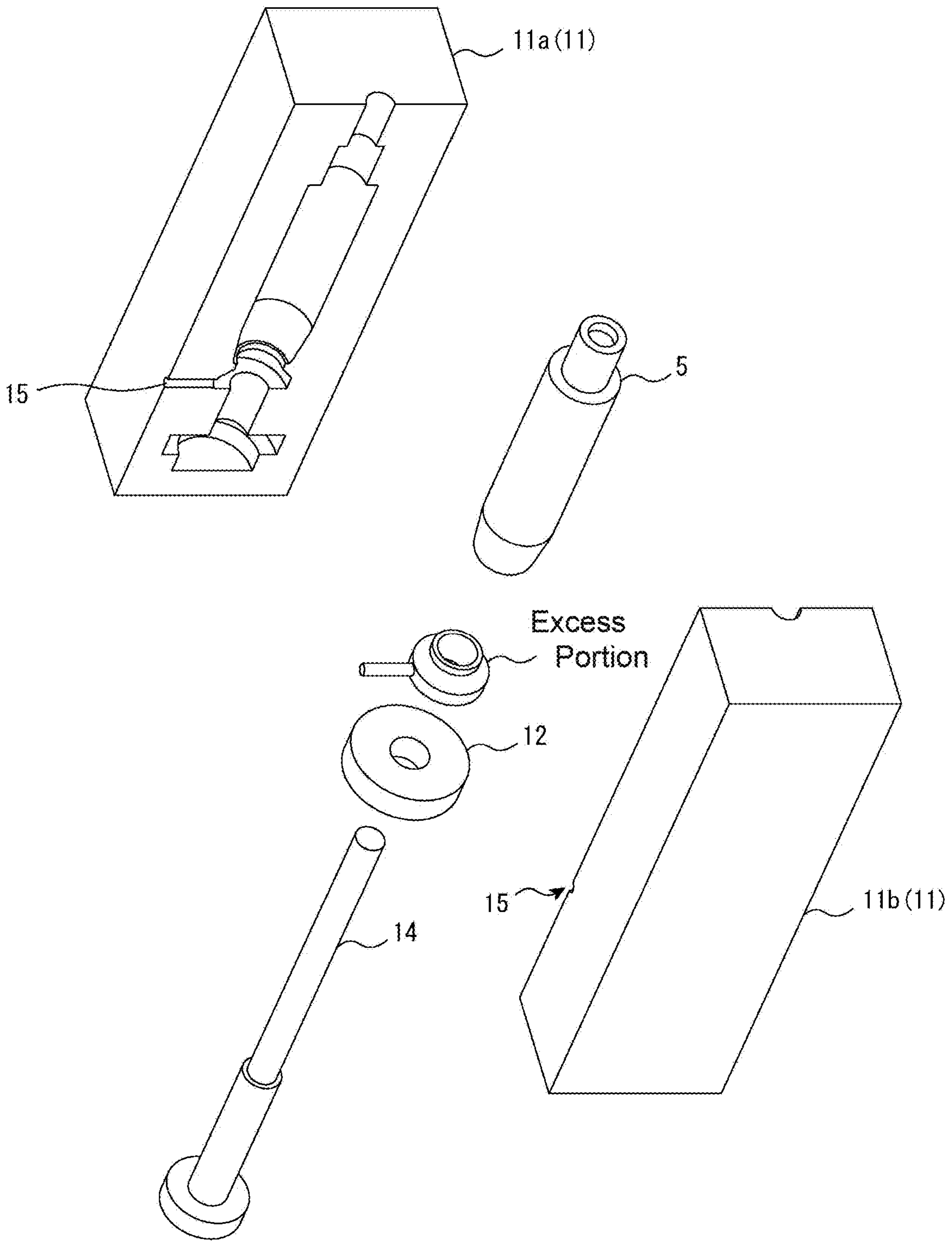
FIG. 4 is an exploded block structural view of a manufacturing member to be used in the method of manufacturing the writing instrument part according to the present invention and a manufactured writing instrument part.

FIG. 3 is a view illustrating an example of a member for manufacturing which is to be used in the method of manufacturing the writing instrument part according to the present embodiment. FIG. 4 is an exploded block structural view of a manufacturing member to be used in the method of manufacturing the writing instrument part according to the present embodiment and a manufactured writing instrument part. As shown in FIG. 3, the front barrel 5 is manufactured by using a mold 11 formed so as to sandwich a first mold 11*a* and a second mold 11*b* and a core pin 14 to which a stripper washer 12 and a paper straw 13 are inserted at a predetermined position. Specifically, the core pin 14 (see FIG. 3), which is integrated by inserting the stripper washer 12 and the paper straw 13, is first set in the mold 11 (being sandwiched by the first mold 11*a* and the second mold 11*b*), and space for forming the front barrel 5 is made in the mold 11. Then, the front barrel 5 is formed by injecting the wooden barrel material described above through the mold spout 15 provided in the mold 11, i.e., by injection molding.

FIGS. 5A to 11F are views illustrating an example of the method of manufacturing a writing instrument part according to the present embodiment. The method of manufacturing the front barrel 5 will be more specifically described below with reference to FIGS. 5*a* to 11F.

Figure 5A:
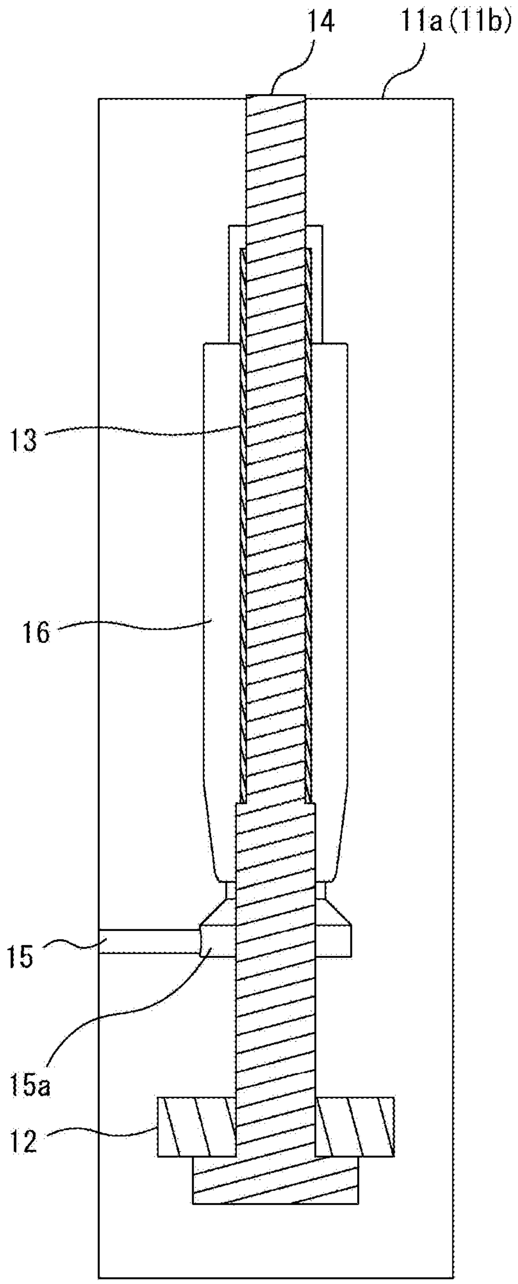
FIGS. 5A and 5B are views illustrating an example of a method of manufacturing the writing instrument part according to the present invention.
Figure 5B:
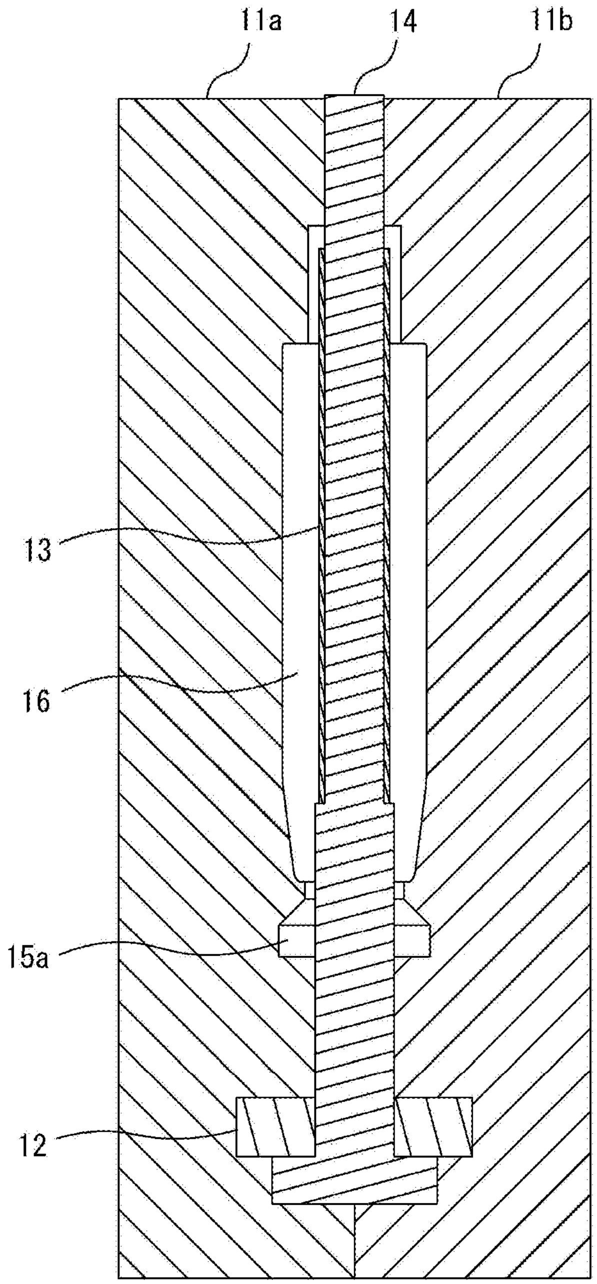

FIGS. 5A and 5B are cross-sectional views of the mold 11 illustrating a state in which the core pin 14, including the stripper washer 12 and the paper straw 13, is placed in the mold 11; FIG. 5A is a front cross-sectional view viewed from the front side of the sandwiching surface, the first mold 11*a* and the second mold 11*b*, of the mold 11 and FIG. 5B is a side cross-sectional view viewed from the side of the mold 11. As shown in FIGS. 5A and 5B, the space 16 having the shape of the front barrel 5 (the wooden barrel tip 4 and the rear barrel 6 being similarly manufactured) is formed by setting the core pin 14 integrated with the stripper washer 12 and the paper straw 13 in the mold 11. In the state in which the core pin 14 is placed, a gate 15*a* connected to a mold spout 15 is formed in the mold 11 as a storage space for wooden barrel material. The gate 15*a* is circumferentially provided on the outer periphery of the core pin 14 between the mold spout 15 and the space 16 so that the wooden barrel material injected through the mold spout 15 is uniformly distributed in the space 16 (see FIGS. 5A and 5B).

Figure 6A:
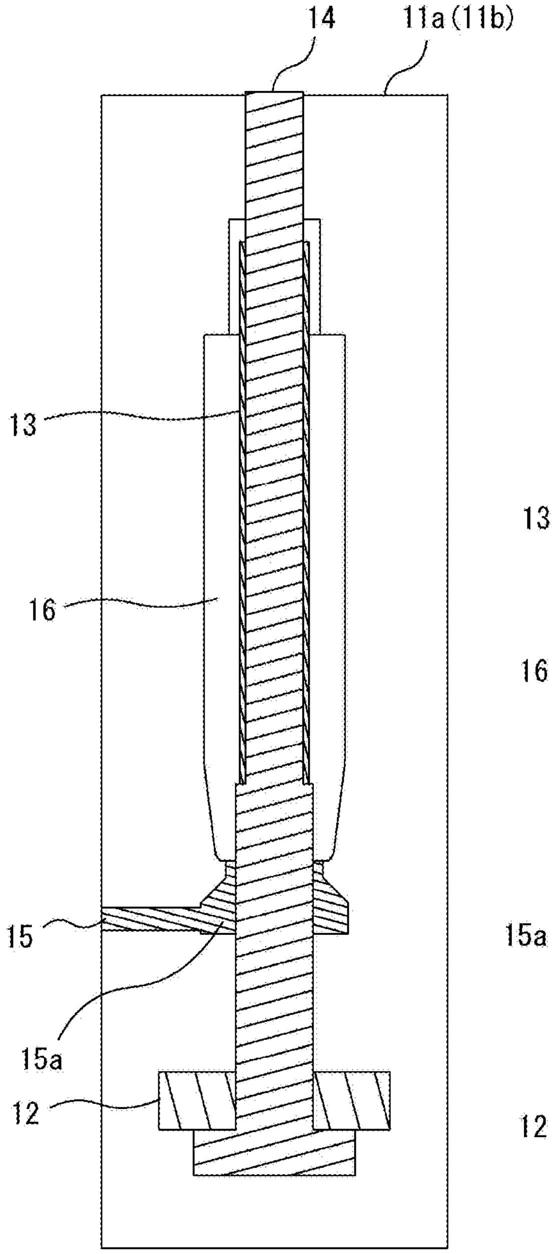
FIGS. 6A and 6B are views illustrating an example of a method of manufacturing the writing instrument part according to the present invention.
Figure 6B:
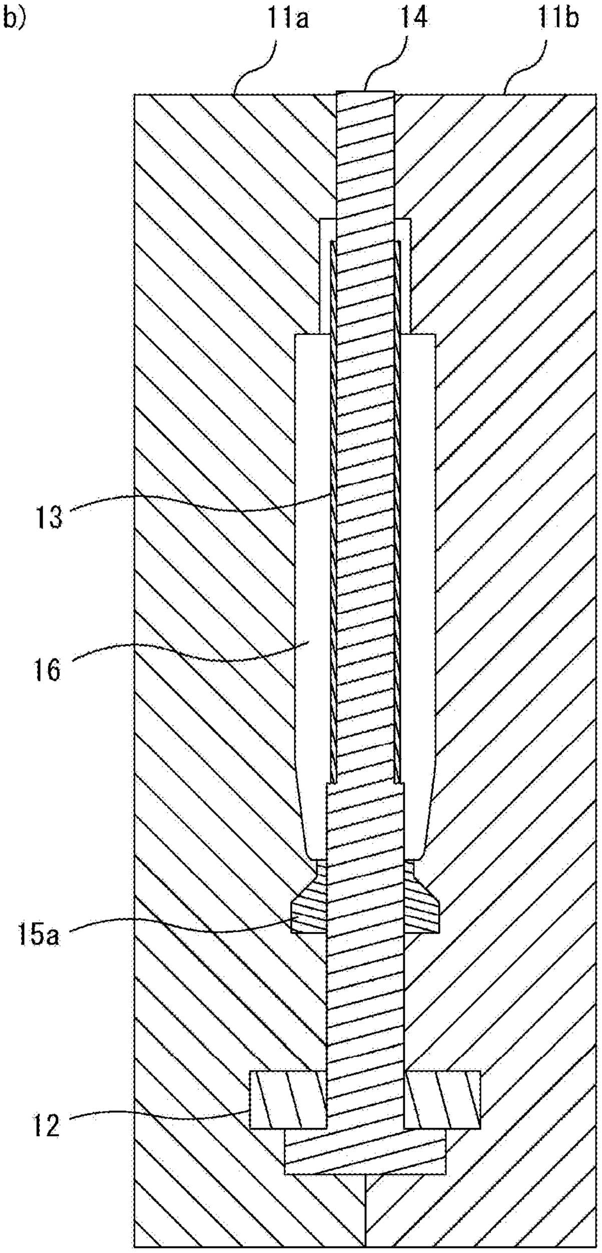
Figure 7A:
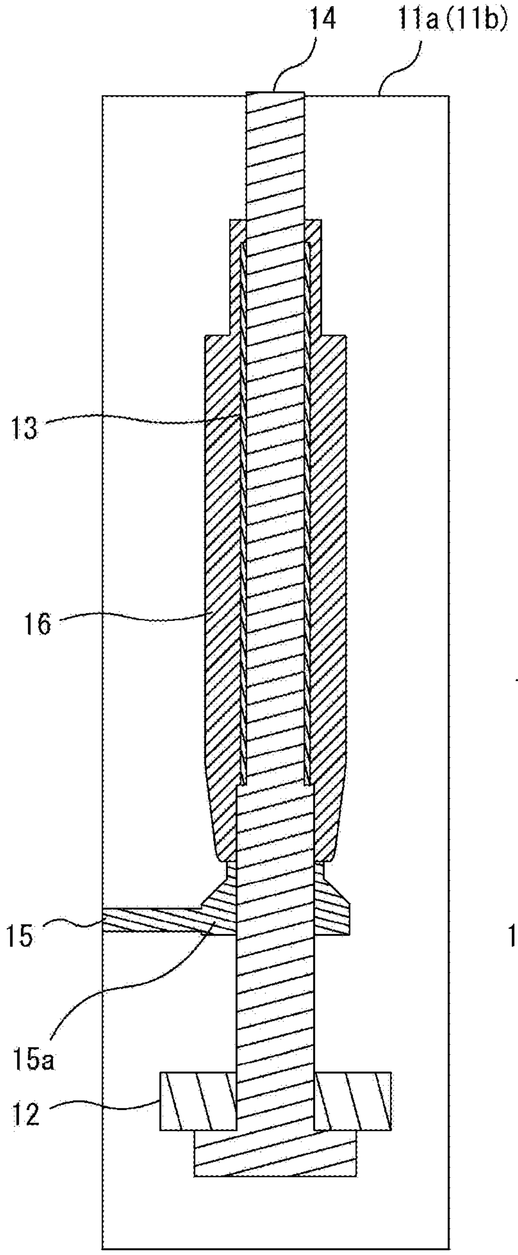
FIGS. 7A and 7B are views illustrating an example of a method of manufacturing the writing instrument part according to the present invention.
Figure 7B:
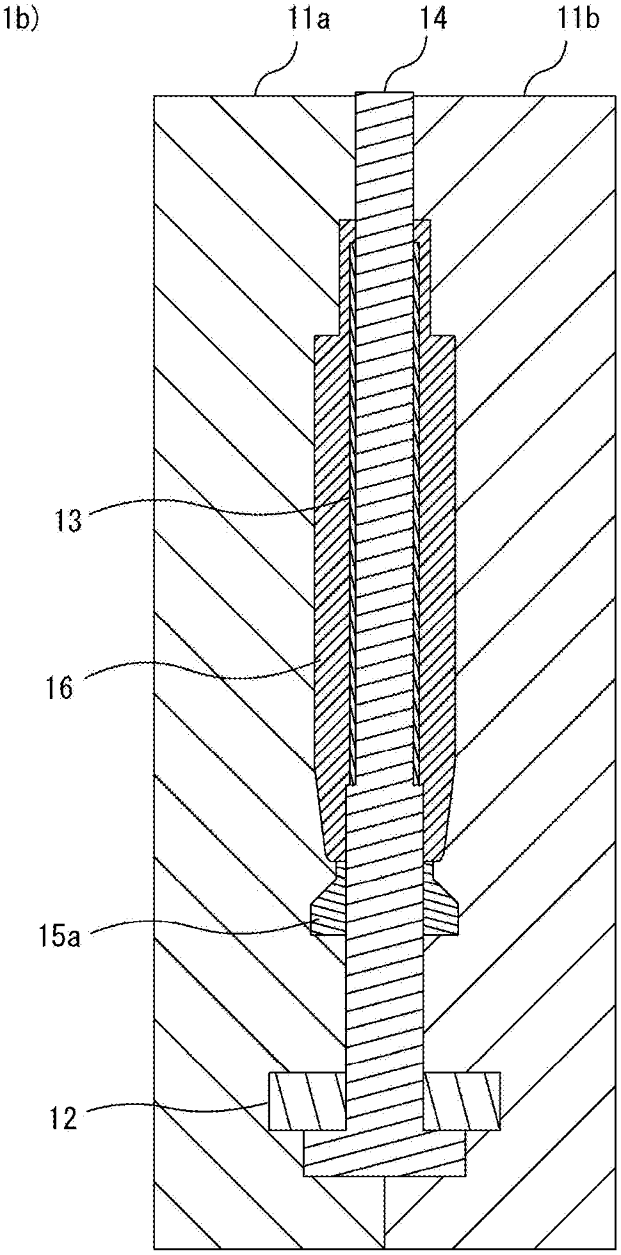

In the above state, the wooden barrel material described above is loaded into a molding machine (not shown), and the molding machine pressure feeds the wooden barrel material into the gate 15*a* through the mold spout 15, and the wooden barrel material stored in the gate 15*a* is further pressure fed to the space 16. Then, the injection pressure is measured at the molding machine as the wooden barrel material is injected, and the injection is stopped when a sudden increase in pressure is detected (the completely filled state). FIGS. 6A and 6B are cross-sectional views of the mold 11 in a state in which the wooden barrel material is injected into the gate 15*a*; FIG. 6A is a front cross-sectional view and FIG. 6B is a side cross-sectional view. FIGS. 7A and 7B are cross-sectional views of the mold 11 in a state in which the mold is completely filled with the wooden barrel material; FIG. 7*a* is a front cross-sectional view and FIG. 7B is a side cross-sectional view.

Figure 8A:
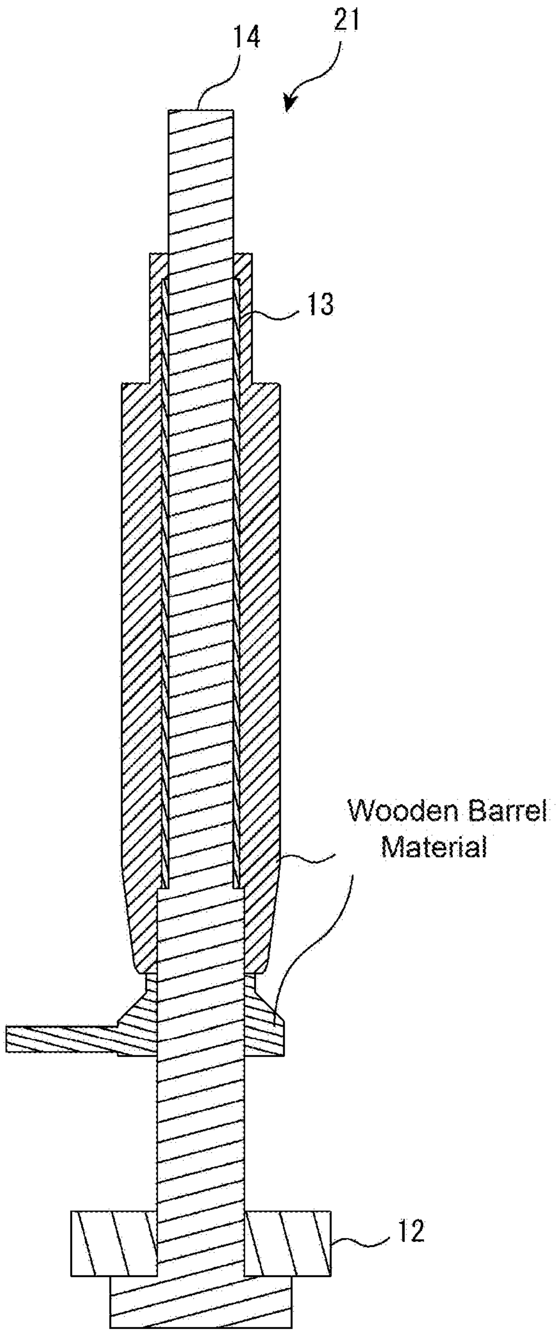
FIGS. 8A and 8B are views illustrating an example of a method of manufacturing the writing instrument part according to the present invention.
Figure 8B:
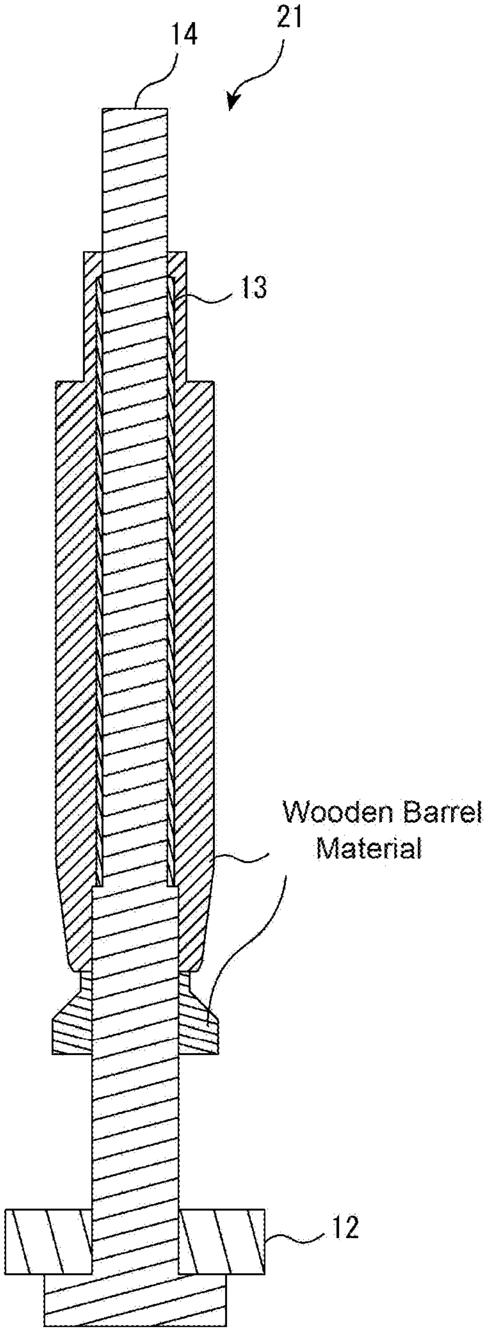

After the injection is completed, the mold 11 (first mold 11*a* and second mold 11*b*) is removed to obtain a molded article 21 in a state in which the core pin 14 (including the stripper washer 12) and the wooden barrel material, which has entered the space 16 and the gate 15*a*, are integrated by insert molding. FIGS. 8A and 8B are cross-sectional views illustrating an example of the molded article 21; FIG. 8A is a front cross-sectional view and FIG. 8B is a side cross-sectional view.

Figure 9A:
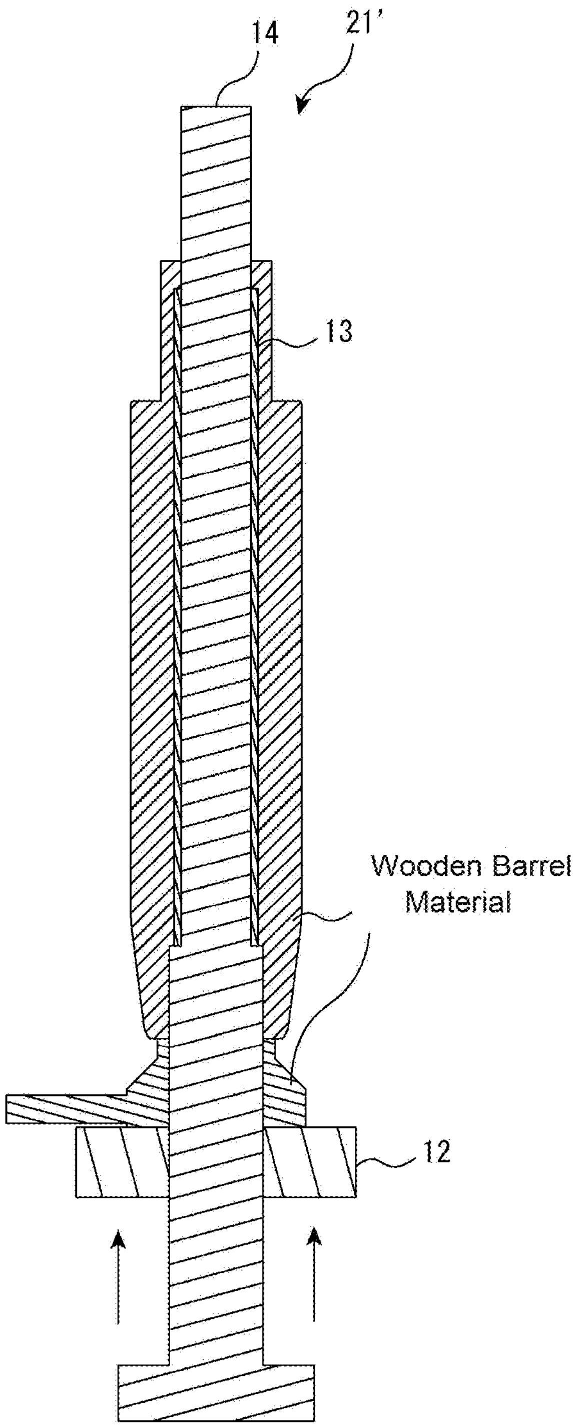
FIGS. 9A and 9B are views illustrating an example of a method of manufacturing the writing instrument part according to the present invention.
Figure 9B:
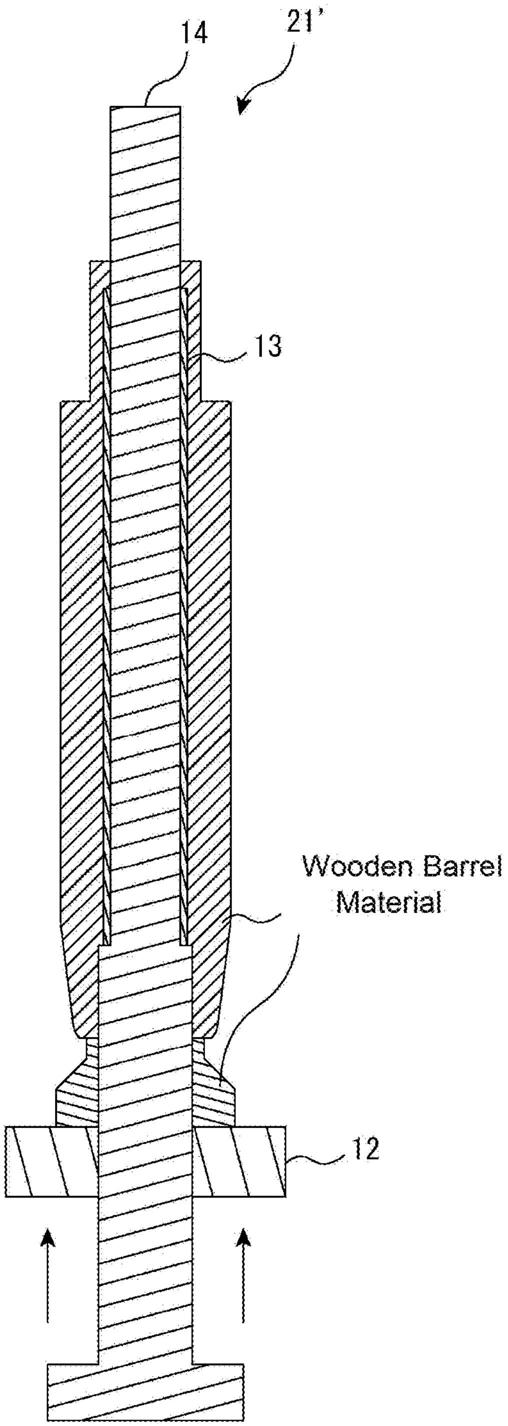
Figure 10A:
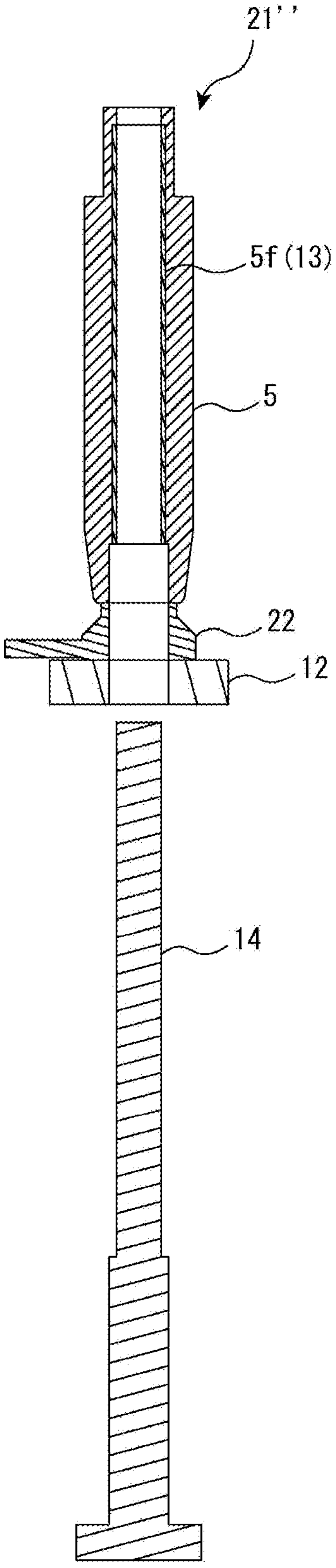
FIGS. 10A and 10B are views illustrating an example of a method of manufacturing the writing instrument part according to the present invention.
Figure 10B:
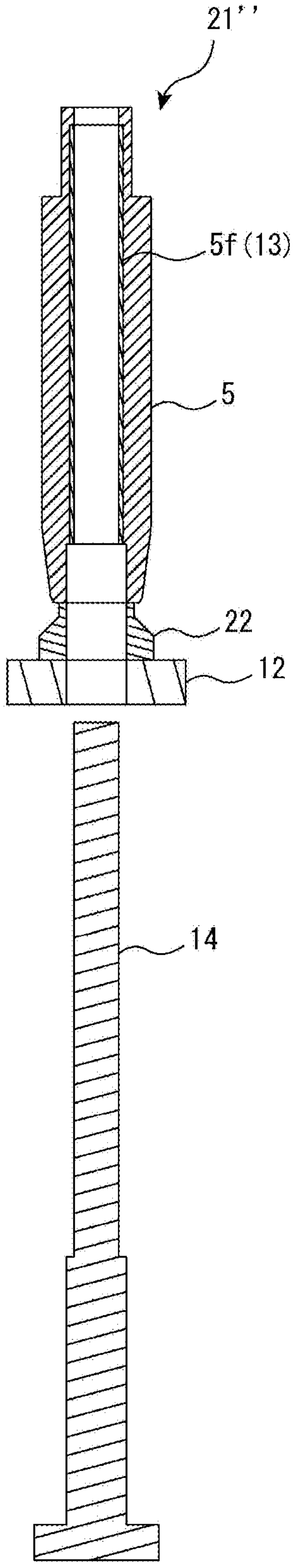

The molded article 21 is then heated in a dryer (not shown) at 150° C. for one hour to harden the wooden barrel material portion shown in FIGS. 8A and 8B. For the molded article 21' after heating, the core pin 14 is pulled out of the hardened wooden barrel material portion (mold releasing) by pushing in the stripper washer 12 (see FIGS. 9A and 9B), and a molded article 21" is obtained in a state in which the front barrel 5 and the excess portion 22 formed in the shape of the gate 15*a* are integrated (see FIGS. 10A and 10B). By releasing the core pin 14, the front barrel 5 is obtained having a two-layer structure comprising a paper straw layer 5*f* composed of paper straw 13 on the inner layer and a wooden barrel layer composed of the connecting portion 5*c*, the cylindrical portion 5*d*, and the tapered portion 5*e* on the outer layer. FIGS. 9A and 9B are cross-sectional views illustrating the molded article 21' in a state in which the stripper washer 12 is pushed in; FIG. 9A is a front cross-sectional view and FIG. 9B is a side cross-sectional view. FIGS. 10A and 10B are cross-sectional views of an example of the molded article 21"; FIG. 10A is a front cross-sectional view and FIG. 10*b* is a side cross-sectional view.

Figures 11A, 11B, 11C, 11D, 11E, 11F:
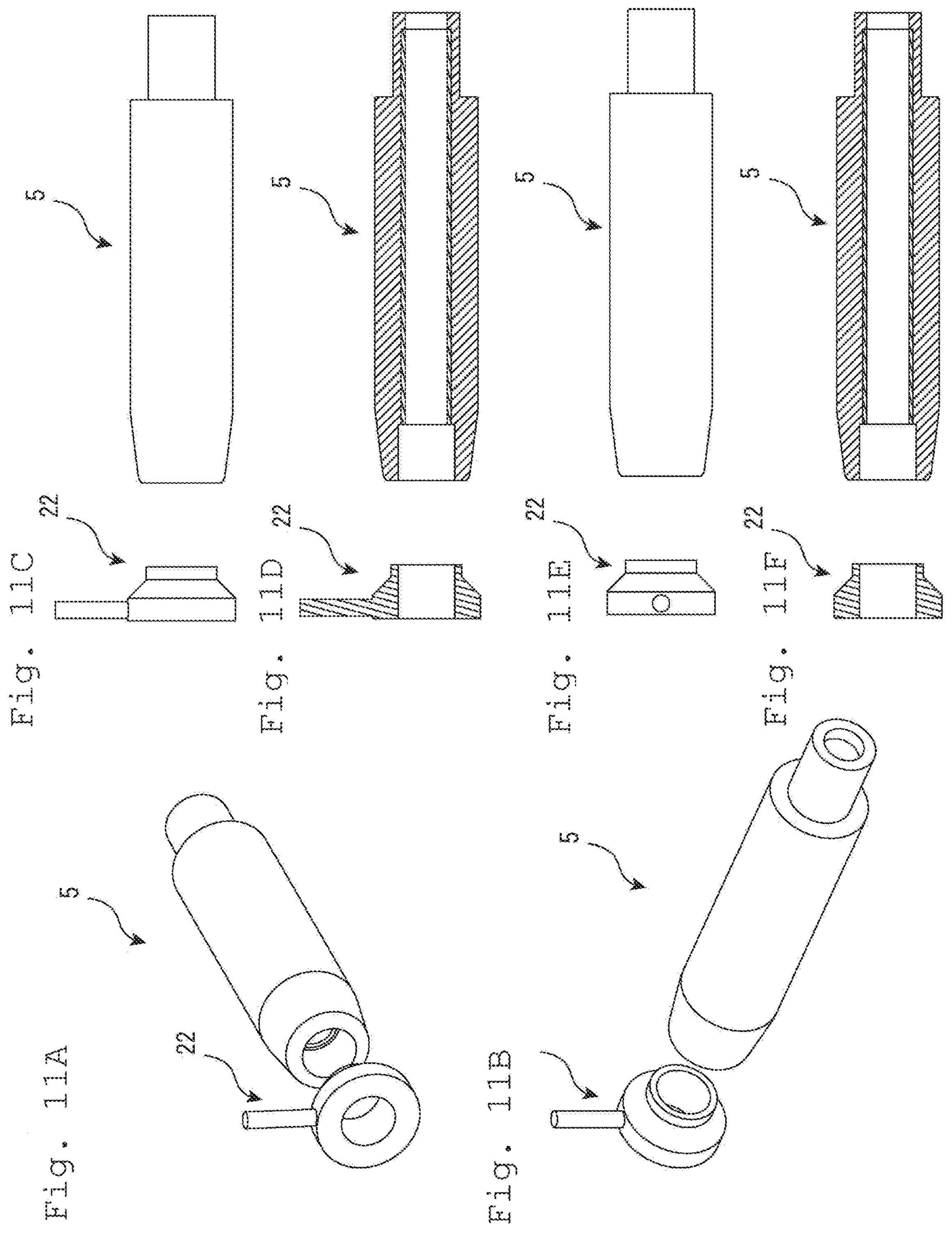
FIGS. 11A to 11F are views illustrating an example of a method of manufacturing the writing instrument part according to the present invention.

At last, the front barrel 5 formed in a predetermined shape is obtained by cutting the excess portion 22 formed in the shape of the gate 15*a* (final process). FIGS. 11A to 11F are views illustrating the final process; FIG. 11A is a front perspective view, FIG. 11B is a rear perspective view, FIG. 11C is a front view, FIG. 11D is a front cross-sectional view, FIG. 11E is a side view, and FIG. 11F is a side cross-sectional view.

In the present embodiment, the method of manufacturing a writing instrument part as an example of barrel material including the wooden barrel tip 4, the front barrel 5, and the rear barrel 6 constituting the barrel 2 of the ballpoint pen 1, it is not limited to the embodiment and the manufacturing method can be applied to any writing instrument having a barrel material which can be manufactured by injection molding.

Advantageous Effects

As described above, for example, the writing instrument parts of this embodiment are manufactured by insert molding, in which a wooden barrel material composed of wood flour, a natural material, and a binder, a water-soluble resin, is injected into the mold 11 to integrate the wooden barrel material and the core pin 14 into which the paper straw 13 is inserted, and then the core pin 14 is released, thereby forming a two-layer structure having a paper straw layer 5*f* on the inner layer and a wooden barrel layer (layers of connecting portion 5*c*, cylindrical portion 5*d*, and tapered portion 5*e*) on the outer layer.

In the manufacturing method of the writing instrument parts of the present embodiment, the space 16 having the shape of the writing instrument part is first formed in the mold 11 by setting the core pin 14 to which the paper straw 13 is attached. Then, the wooden barrel material composed of wood flour and a binder which is a water-soluble resin is injected into the space 16 through the mold spout 15 provided on the mold 11. After the injection is completed, the mold 11 is removed and the molded article 21 is manufactured in the state in which the wooden barrel material and the core pin 14 are integrated by insert molding. Then, by heating the molded article 21 to harden and releasing the core pin 14 from the heated molded article 21', the writing instrument part having the two-layer structure with the paper straw layer 5*f* on the inner layer thereof and the wooden barrel layer on the outer layer thereof is obtained.

Thus, the core pin 14 is made slippery by the paper straw layer 5*f*, which is the paper straw 13, and the releasability when the core pin 14 is pulled out can be greatly improved.

INDUSTRIAL APPLICABILITY

As described above, the writing instrument part and the method of manufacturing the writing instrument part according to the present invention are useful as one of the endeavors to global environmental problems such as reducing the use of plastics.

LIST OF REFERENCE SIGNS

1 ballpoint pen (writing instrument)
2 barrel
3 refill
3*a* ballpoint pen tip
3*b* ink reservoir
3*c* joint member
3*d* flange portion
4 wooden barrel tip
4*a* upper surface
5 front barrel
5*a* locking member
5*b* penetrating hole
5*c* connecting portion
5*d* cylindrical portion
5*e* tapered portion
5*f* inner layer (paper straw layer)
6 rear barrel
11 mold
11*a* first mold
11*b* second mold
12 stripper washer
13 paper straw
14 core pin
15 mold spout
15*a* gate
16 space
21 molded article
22 excess portion

What is claimed is:

1. A method of manufacturing a writing instrument part, comprising the steps of:
forming a space having the shape of a writing instrument part by setting a core pin to which a paper straw is attached in a mold;
injecting a wooden barrel material composed of wood flour and a binder which is a water-soluble resin into the space from a mold spout provided in the mold;
producing a first molded article in a state in which the wooden barrel material and the core pin are integrally formed by insert molding by removing the mold after injection; and
obtaining a writing instrument part having a two-layer structure with a paper straw layer on the inner layer and a wooden barrel layer on the outer layer, by heating the first molded article to harden and releasing the core pin from a second molded article, which is the heated first molded article.

2. The method of manufacturing a writing instrument part according to claim 1,
wherein
a gate is formed in the mold, connected to the mold spout as a storage space for the wooden barrel material, the gate is provided circumferentially on the outer periphery of the core pin between the mold spout and the space, the writing instrument part having a two-layer structure is obtained by releasing the core pin from the second molded article and cutting off an excess portion formed in a shape of the gate.

3. The method of manufacturing a writing instrument part according to claim 1,
wherein the heating of the first molded article is carried out under the condition of a temperature of 150° C. for one (1) hour.

4. The method of manufacturing a writing instrument part according to claim 1,
wherein the wood flour is a powder of cedar, cypress, bamboo, or cork.

5. The method of manufacturing a writing instrument part according to claim 1,
wherein the binder is cellulose or a cellulose derivative.

6. The method of manufacturing a writing instrument part according to claim 1, wherein the paper straw is biodegradable.

* * * * *